United States Patent
Gunderson

(10) Patent No.: US 7,365,937 B2
(45) Date of Patent: Apr. 29, 2008

(54) INERT GAS ATMOSPHERE REPLENISHMENT STRUCTURE

(75) Inventor: Neal F. Gunderson, Lake Elmo, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 487 days.

(21) Appl. No.: 10/861,621

(22) Filed: Jun. 4, 2004

(65) Prior Publication Data

US 2005/0270690 A1 Dec. 8, 2005

Related U.S. Application Data

(60) Provisional application No. 60/489,874, filed on Jul. 24, 2003.

(51) Int. Cl.
*G11B 33/14* (2006.01)

(52) U.S. Cl. .................................................. 360/97.02

(58) Field of Classification Search ............. 360/97.02, 360/97.03, 97.04; 236/44; 523/201
See application file for complete search history.

(56) References Cited

U.S. PATENT DOCUMENTS

| | | | |
|---|---|---|---|
| 4,155,897 A | 5/1979 | Schiisener | |
| 4,275,835 A | 6/1981 | Miksic | |
| 4,789,913 A | 12/1988 | Gregory | |
| 5,202,803 A | 4/1993 | Albrecht | |
| 5,229,899 A | 7/1993 | Brown | |
| 5,909,337 A | 6/1999 | Tyndall | |
| 6,433,957 B1 | 8/2002 | Rudd | |
| 6,785,089 B2 * | 8/2004 | Bernett et al. | ........... 360/97.02 |
| 2002/0010462 A1 * | 1/2002 | Altman | ........................ 606/41 |
| 2002/0165295 A1 * | 11/2002 | Matsumoto et al. | ........ 523/201 |
| 2002/0172762 A1 | 11/2002 | Schmidt | |
| 2005/0264926 A1 * | 12/2005 | Burts-Cooper et al. | .. 360/97.02 |
| 2006/0032931 A1 * | 2/2006 | Gunderson | ................ 236/44 A |

FOREIGN PATENT DOCUMENTS

WO WO03041081 A2 * 5/2003

OTHER PUBLICATIONS

U.S. Appl. No. 60/574,370, filed May 2004, Bursts-Coope et al.*

* cited by examiner

*Primary Examiner*—Tianjie Chen
(74) *Attorney, Agent, or Firm*—Fellers, Snider, et al.

(57) ABSTRACT

Method and apparatus for replenishing an inert gas atmosphere. A replenishment structure includes a reservoir which encloses an internal inert gas atmosphere. The reservoir has a permeable wall through which inert gas molecules from the internal atmosphere diffuse substantially at a first rate. A control material adjacent the reservoir provides a path through which the inert gas molecules further diffuse substantially at a second rate less than the first rate to replenish a surrounding inert gas atmosphere. The control material preferably surrounds or otherwise confines the reservoir, and diffuses the molecules at a rate selected in relation to which inert gas molecules from a surrounding gas atmosphere escape from a housing in which the replenishment structure is disposed. The permeable wall preferably comprises glass and the inert gas preferably comprises helium. As desired, the inert gas molecules can further be diffused through a second control material to the surrounding atmosphere.

18 Claims, 3 Drawing Sheets

INERT GAS ATMOSPHERE REPLENISHMENT STRUCTURE

RELATED APPLICATIONS

This application claims the benefit of prior filed U.S. Provisional Patent Application No. 60/489,874 entitled "Inert Gas Atmosphere Replenishment Structure," filed Jul. 24, 2003, the contents of which are hereby incorporated by reference.

FIELD OF THE INVENTION

The claimed invention relates generally to the field of diffusion structures and more particularly, but not by way of limitation, to an apparatus and method for replenishing an inert gas atmosphere such as utilized within a hermetically sealed housing of a data storage device.

BACKGROUND

Disc drives are digital data storage devices which store and retrieve large amounts of user data in a fast and efficient manner. The data are magnetically recorded on the surfaces of one or more data storage discs (media) affixed to a spindle motor for rotation at a constant high speed.

An array of vertically aligned data transducing heads are controllably positioned by an actuator to read data from and write data to tracks defined on the recording surfaces. An actuator motor rotates the actuator to move the heads across the disc surfaces. The heads are configured to be hydrodynamically supported adjacent the disc surfaces by fluidic pressures established by the high speed rotation of the discs.

Device designers have proposed hermetically sealed designs that utilize a lower density atmosphere, such as an inert gas (helium, etc.). While providing higher levels of operational performance, it has sometimes been found difficult to adequately seal such a housing to prevent the escape of a substantial amount of the inert gas atmosphere over the operational life of the device.

With the continued demand for higher performance data storage devices, there remains a continual need for improved housing configurations. It is to these and other improvements that the claimed invention is generally directed.

SUMMARY OF THE INVENTION

As embodied herein and as claimed below, the present invention is generally directed to an apparatus and method for replenishing an inert gas atmosphere.

In accordance with some preferred embodiments, a replenishment structure is generally provided comprising a reservoir which encloses an internal inert gas atmosphere. The reservoir has a permeable wall through which inert gas molecules from the internal atmosphere diffuse substantially at a first rate.

A control material adjacent the reservoir provides a path through which the inert gas molecules further diffuse substantially at a second rate less than the first rate to replenish a surrounding inert gas atmosphere.

Preferably, the second rate of diffusion is substantially selected to match a rate at which inert gas molecules from the surrounding inert gas atmosphere escape from a housing. The permeable wall preferably comprises glass and the inert gas preferably comprises helium. The control material preferably comprises an epoxy, polyimide, ethylene vinyl alcohol polymer (EVOH), ultra high density polyethylene, or other suitable material which confines the reservoir.

A second control material can further be provided through which the inert gas molecules further diffuse at a third rate less than the first rate. A restriction layer such as a layer of metal foil can also be provided adjacent a portion of the control material to substantially restrict passage of the inert gas molecules in the vicinity of the restriction layer.

In accordance with further preferred embodiments, an apparatus is provided comprising the foregoing replenishment structure in combination with a housing which encloses the replenishment structure in an inert gas atmosphere.

In accordance with further preferred embodiments, the method generally comprises enclosing an inert gas atmosphere and a replenishment structure within a housing, the replenishment structure comprising a reservoir adjacent a control material, the reservoir having a permeable wall.

The method further preferably comprises using the replenishment structure to replenish the inert gas atmosphere by diffusing inert gas molecules through the permeable wall at a first rate and then through the control material at a second rate less than the first rate.

As before, the second rate of diffusion is preferably selected in relation to a rate at which inert gas molecules of the inert gas atmosphere escape from the housing, and the inert gas molecules preferably comprise helium molecules.

These and various other features and advantages which characterize the claimed invention will become apparent upon reading the following detailed description and upon reviewing the associated drawings.

DETAILED DESCRIPTION

Figure 1:
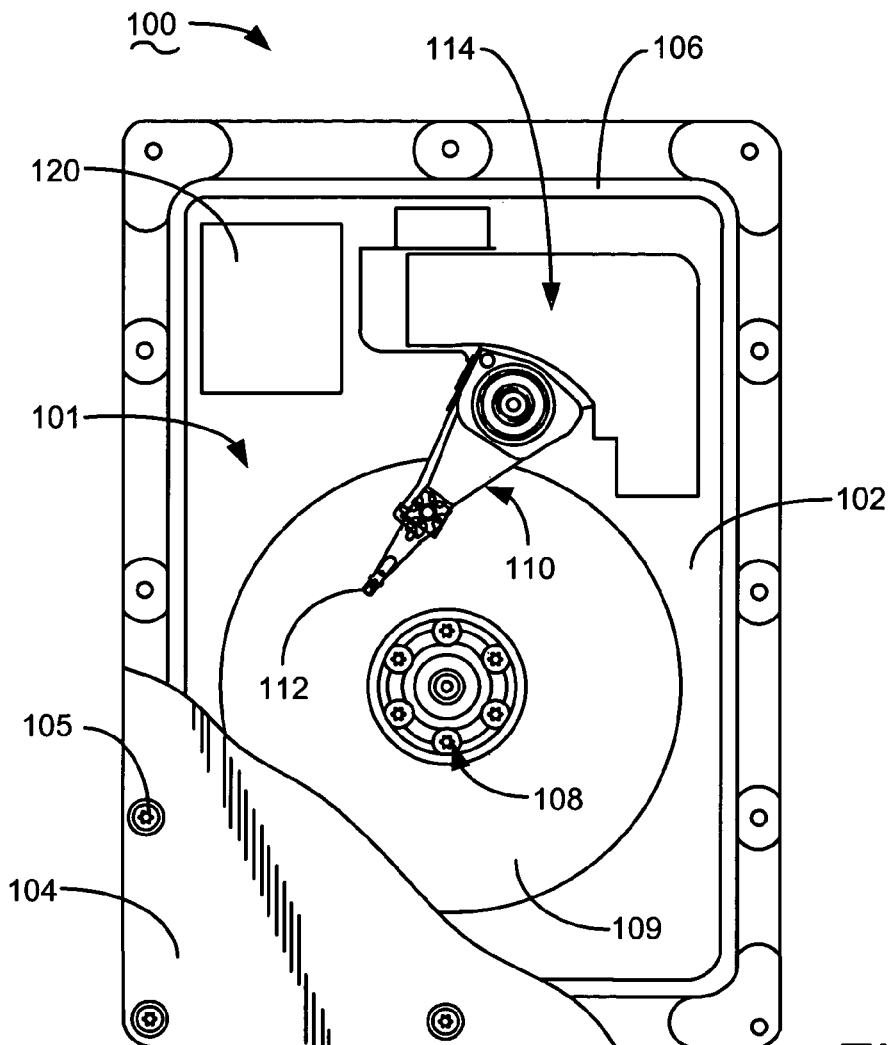
FIG. 1 is a top plan representation of a hermetically sealed data storage device which utilizes an internal inert gas atmosphere.

FIG. 1 provides a top plan representation of a data storage device 100 constructed in accordance with preferred embodiments of the present invention. The data storage device is preferably characterized as a disc drive of the type which magnetically stores and retrieves digital data from and to a host device.

A hermetically sealed housing 101 encapsulates an inert gas atmosphere, preferably comprising helium. The housing is formed by a pair of substantially planar housing members including a base deck 102 and a top cover 104 (the latter of which is shown in partial cut-away in FIG. 1).

The top cover 104 is affixed to the base deck 102 via fasteners 105. A metal compression seal 106 is compressed between the base deck 102 and top cover 104 to effect a housing seal. Alternative methodologies for joining and sealing the base deck 102 and top cover 104 are readily envisioned, including the use of laser welding.

A spindle motor 108 is supported within the housing and rotates a number of recording media (discs) 109 at a constant high speed during operation. A rotary actuator 110 supports a corresponding number of data transducing heads 112 adjacent data recording surfaces of the media 108.

The heads 112 are hydrodynamically supported adjacent the disc surfaces via recirculating fluidic currents in the inert gas atmosphere established by the high speed rotation of the discs 108. The actuator 110 is pivotally rotated through application of current to a voice coil motor (VCM) 116 to bring the heads 112 into alignment with data tracks defined on the disc surfaces.

Figure 2:
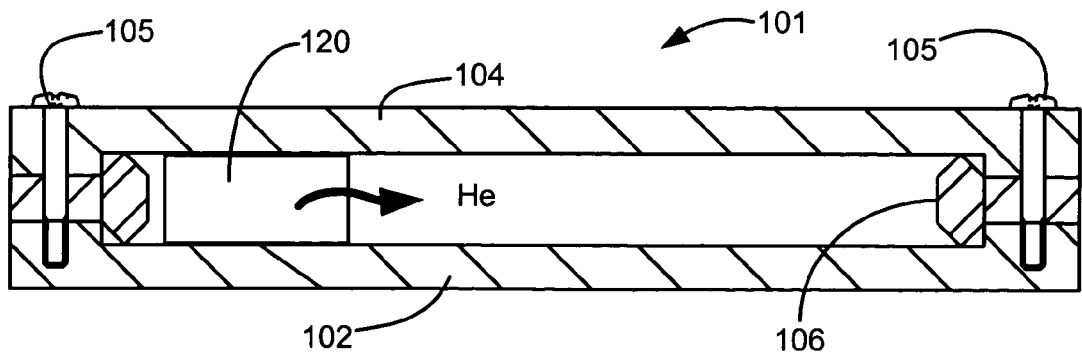
FIG. 2 is a side elevational view of the housing of the device of FIG. 1 in conjunction with a replenishment structure constructed in accordance with preferred embodiments of the present invention.

FIG. 1 further shows a replenishment structure 120 supported within the interior of the housing. As schematically depicted in FIG. 2, the replenishment structure 120 operates to controllably diffuse inert gas molecules into remaining portions of the interior of the housing. This serves to replenish the inert gas atmosphere as a result of, for example, leakage or permeation of the inert gas atmosphere through the housing 101. Any suitable location and configuration of the replenishment structure 120 can be used as required depending upon the application.

Figure 3:
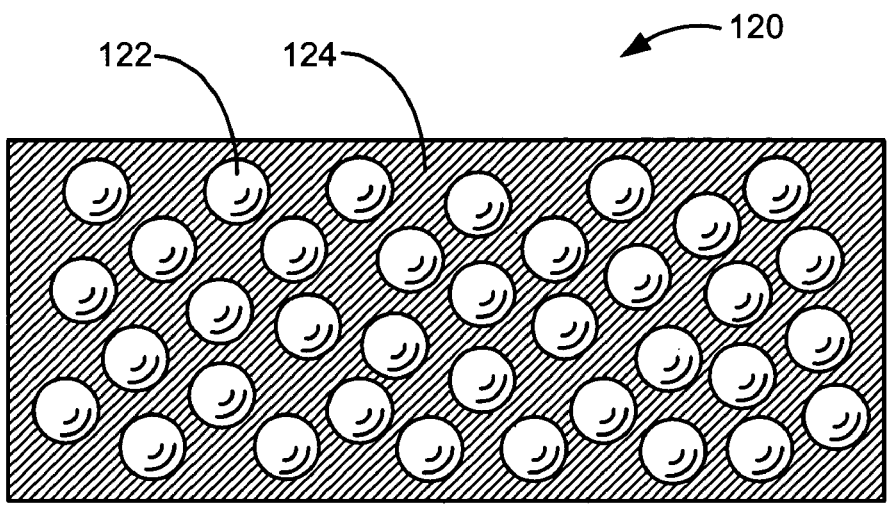
FIG. 3 shows the replenishment structure of FIG. 2 in greater detail in accordance with a preferred embodiment.

FIG. 3 illustrates the replenishment structure 120 in greater detail in accordance with a preferred embodiment. The replenishment structure 120 preferably comprises a plurality of reservoirs 122 encapsulated in a control material 124. The reservoirs 122 are preferably characterized as hollow glass spheres, although other suitable shapes and materials can be utilized as desired.

Figure 4:
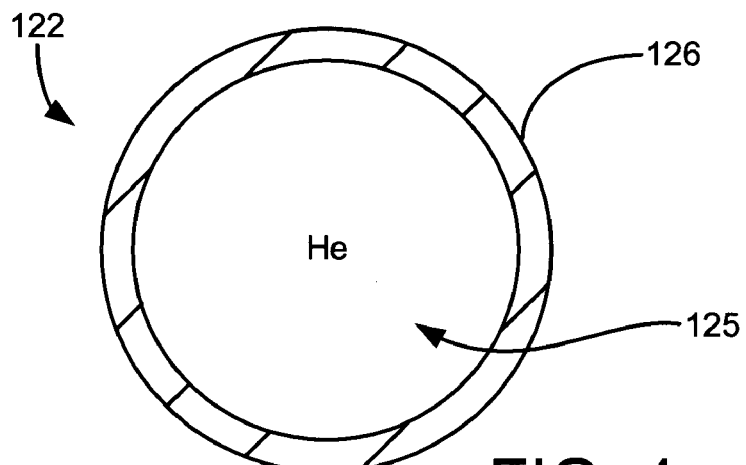
FIG. 4 is a cross-sectional view of one of the reservoirs of FIG. 3.

As further shown in FIG. 4, each reservoir 122 comprises a permeable wall 126 that defines an interior 128. The interior 128 of the reservoir 122 is initially supplied with an inert gas atmosphere at a selected pressure. By way of illustration, it is contemplated in the present example that the inert gas atmosphere comprises helium at an initial pressure of around 5,000 pounds per square inch, psi. Suitable, commercially available structures for the reservoirs 122 are micro-spheres provided by 3M Co., St. Paul, Minn., USA.

Helium molecules from the inert gas atmosphere within the reservoir 122 will diffuse through the permeable wall 126 over time substantially at a selected rate. This rate of diffusion will generally be determined by a number of well known factors, including the mass of the molecules, the material from which the permeable wall 126 is constructed, the wall thickness of the permeable wall, the relative atmospheric pressures inside and outside the member 122, the ambient temperature, etc.

The control material 124 is configured to confine the reservoirs 122, as well as to controllably diffuse the helium molecules emitted from the reservoirs 122 substantially at a second rate less than the first rate. In this way, the helium molecules will diffuse through the permeable walls 126 and then through the control material 124 to replenish the surrounding helium atmosphere within the housing 101.

A number of suitable materials can be utilized for the control material 124. When helium is used, such materials may include epoxies (thermoset resins), polyimides, ethylene vinyl alcohol polymer (EVOH) or ultra high density polyethylene. Since it has been found that helium does not significantly diffuse through metals, the foregoing materials can also be mixed with metallic particles to further control the flow of the helium molecules into and through the control material 124.

The rate at which the helium molecules diffuse through the control material 124 will depend upon a number of factors including the composition and thickness thereof. Using the current example, it is contemplated that the surrounding helium gas atmosphere within the housing 101 is nominally at around one standard atmosphere (i.e., about 14.7 psi), and the pressure of the helium that diffuses from the replenishment structure 120 is emitted at around that same level.

It is contemplated that the helium concentration within the control material 124 will be low initially, and this concentration will increase substantially over time as the molecules begin diffusing from the reservoirs 122. Care should be taken to ensure that internal stresses within the control material 124 do not build to a point where damage or rupturing takes place as a result of the release of the helium molecules from the reservoirs 122. Acceptable steady state concentrations and diffusion rates for the molecules can be achieved and maintained through the proper selection of the number and arrangement of reservoirs 122, the initial pressure within the reservoirs, dimensions and composition of the control material 124, etc.

Figure 5:
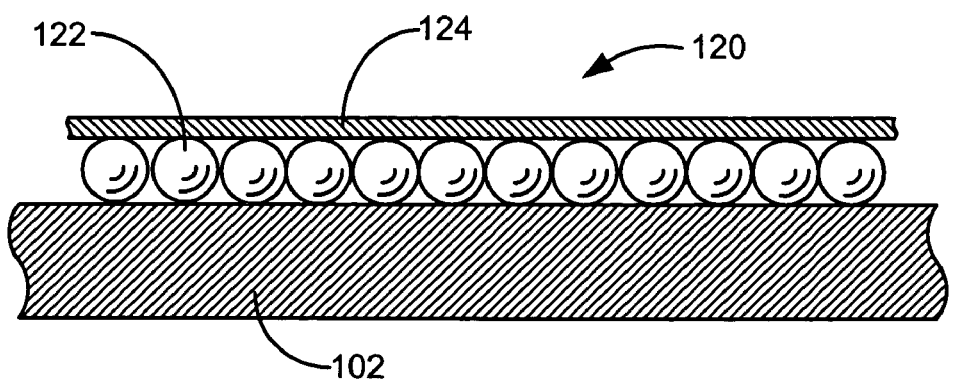
FIG. 5 illustrates the replenishment structure of FIG. 2 in accordance with an alternative embodiment.

FIG. 5 provides an alternative embodiment for the replenishment structure 120 of FIG. 2. In this embodiment, the control material 124 is characterized as a layer of material, such as adhesive. As before, the material 124 confines the reservoirs 122 and provides a second diffusion path through which the helium molecules diffuse. The configuration of FIG. 5 allows the replenishment structure 120 to be readily formed onto the base deck 102 (as shown) or top cover 104, or into a pouch or other structure utilized within the device 100, as desired.

Figure 6:
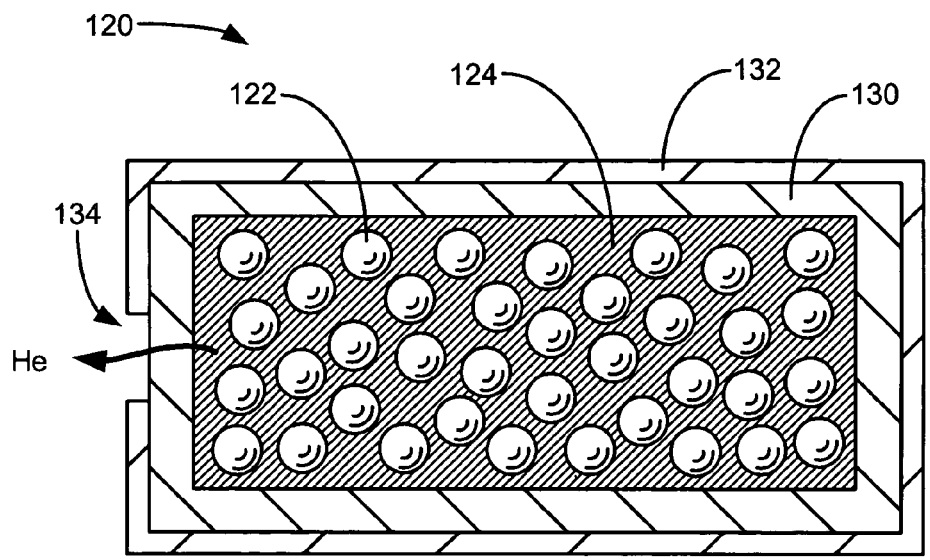
FIG. 6 shows another alternative embodiment for the replenishment structure of FIG. 2.

FIG. 6 illustrates another embodiment for the diffusion structure 120 of FIG. 2. In this embodiment the reservoirs 122 are encapsulated in the control material 124, and both are further retained within an enclosure 130 formed from a second control material. The second material also permits diffusion of the helium molecules at a selected rate less than the rate at which the molecules diffuse through the permeable walls 126.

It is contemplated that the enclosure 130 is injection molded or otherwise formed using a suitable process to provide a substantially rigid structure into which the reservoirs 122 and control material 124 are placed. A restriction layer of substantially impermeable material 132, such as metal foil, covers substantially all of the outer surface area of the enclosure 130. A diffusion window portion 134 remains uncovered, however, to permit diffusion of the helium molecules to the surrounding atmosphere as shown.

While preferred, it is not necessary that the reservoirs 122 be encapsulated in the control material 124; that is, in an alternative embodiment the reservoirs 122 can be loosely arrayed within the enclosure 130 of FIG. 6. Thus, the reservoirs 122 remain contained within the enclosure 130, but are otherwise generally free to move around therein.

Figure 7:
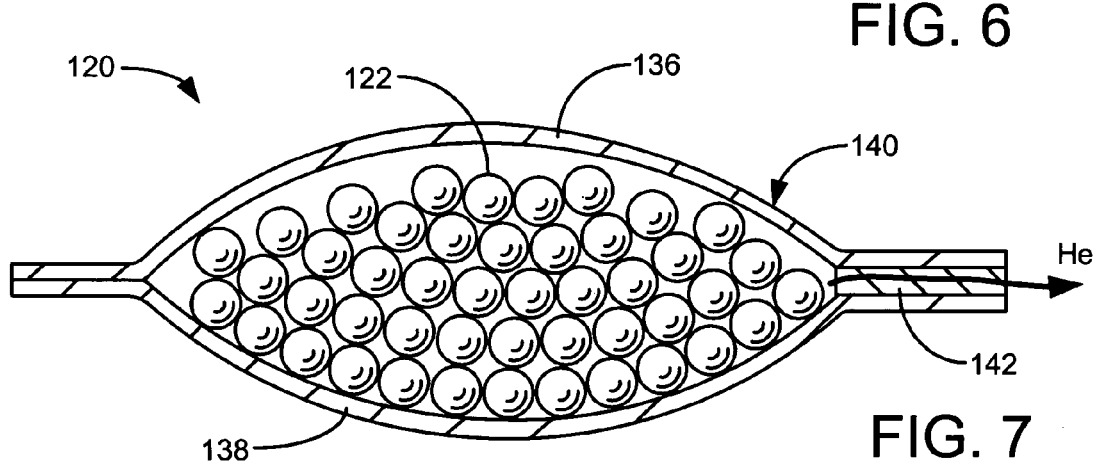
FIG. 7 shows yet another alternative, embodiment for the replenishment structure.

FIG. 7 provides yet another alternative embodiment for the replenishment structure 120. In FIG. 7, opposing top and bottom layers 136, 138 of impermeable material, such as metal foil, form an enclosure 140 in which a plurality of the reservoirs 122 are disposed. The reservoirs 122 can be free to move around within the enclosure 140 as shown, or can be encapsulated in a control material in a manner similar to that set forth by FIG. 6.

The opposing layers 136, 138 are sealed together around a substantial portion of the periphery of the enclosure 140. A localized layer 142 of control material is sandwiched between the layers 136, 138 along the remainder of the periphery of the enclosure 140. In this way, the layer 142 provides an elongated diffusion path so that helium molecules from the reservoirs 122 diffuse along a length of the layer 142 to reach the surrounding atmosphere.

Figure 8:
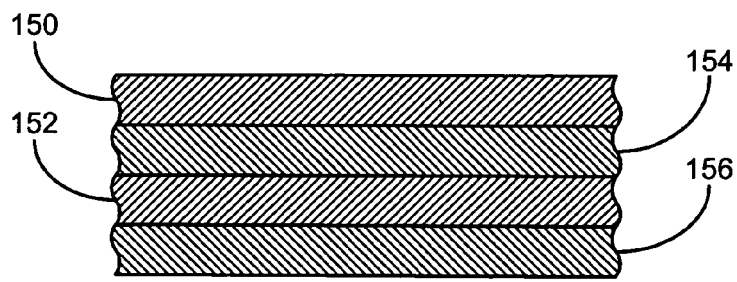
FIG. 8 illustrates a number of laminated layers that are incorporated into the replenishment structure of FIG. 7 in accordance with yet another alternative embodiment.

A laminated structure can also be used to form portions of the enclosure 140. For example, FIG. 8 shows alternating layers of metal foil 150, 152 and permeable control material 154, 156 which are arranged to further contour the diffusion path. Apertures (not shown) through the metal foil layers 150, 152 can also be formed as desired to provide a diffusion labyrinth to control the flow of the helium (or other inert gas) molecules.

It will now be appreciated that the various preferred embodiments discussed herein present several advantages over the prior art. The operational life of the data storage device 100 depends in part on maintaining the inert gas atmosphere above a certain minimum level in order to allow the heads 112 to fly at the desired fly heights, etc. Thus, by controllably replenishing the surrounding inert gas atmosphere of the device 100 in the manner discussed above, the operational life of the device can be advantageously increased. Indeed, it is contemplated that in some applications less costly housing sealing methodologies can be utilized since a higher "acceptable" leak rate can be established due to the ameliorating effects of the replenishment structure 120.

The replenishment structure 120 can be readily and inexpensively fabricated and installed using automated manufacturing processes. The two-stage (or higher) diffusion allows the rate of helium or other inert gas to be emitted at substantially any desired rate.

The material used to secure the reservoirs 122 in the various embodiments discussed above advantageously prevents debris from the reservoirs from migrating into remaining areas of the interior of the housing, should the members become inadvertently damaged during handling, etc.

While the various embodiments presented herein utilize a plurality of internal reservoirs, such is not necessarily required; further embodiments are envisioned that utilize a single reservoir so that the inert gas diffuses through the reservoir and then through one or more zones of control material to the surrounding atmosphere. Other shapes, sizes and configurations of the reservoir(s) can also be utilized.

In view of the foregoing, it will now be understood that the present invention (as embodied herein and as claimed below) is generally directed to an apparatus and method for replenishing an inert gas environment.

In accordance with some preferred embodiments, a replenishment structure (such as 120) is generally provided comprising a reservoir (such as 122) which encloses an internal inert gas atmosphere. The reservoir comprises a permeable wall (such as 126) through which inert gas molecules from said atmosphere diffuse substantially at a first rate.

A control material (such as 124, 130, 142, 154, 156) confines the reservoir and provides a path through which the inert gas molecules further diffuse substantially at a second rate less than the first rate to replenish a surrounding inert gas atmosphere.

Preferably, the second rate of diffusion is substantially selected to match a rate at which inert gas molecules from the surrounding inert gas atmosphere escape from a housing. The permeable wall preferably comprises glass and the inert gas preferably comprises helium. The control material preferably comprises an epoxy, polyimide, ethylene vinyl alcohol polymer (EVOH), ultra high density polyethylene, or other suitable material.

A second control material (such as 130, 142) can further be provided through which the inert gas molecules diffuse at a third rate less than the first rate to replenish the surrounding inert gas atmosphere. A restriction layer of substantially impermeable material, such as metal foil, can also be provided adjacent a portion of the control material to substantially restrict passage of the inert gas molecules therethrough.

In accordance with further preferred embodiments, an apparatus is provided comprising the foregoing replenishment structure in combination with a housing (such as 101) which encloses the replenishment structure in an inert gas atmosphere.

In accordance with further preferred embodiments, the method generally comprises enclosing an inert gas atmosphere and a replenishment structure (such as 120) within a housing (such as 101), the replenishment structure comprising a reservoir (such as 122) confined by a control material (such as 124, 130, 142), the reservoir having a permeable wall (such as 126).

The method further preferably comprises using the replenishment structure to replenish the inert gas atmosphere by diffusing inert gas molecules through the permeable wall at a first rate and through the control material at a second rate less than the first rate. As before the second rate of diffusion is preferably selected in relation to a rate at which inert gas molecules of the inert gas atmosphere escape from the housing, and the inert gas molecules of the using step preferably comprise helium molecules.

For purposes of the appended claims, the recited means for replenishing said atmosphere will be understood to correspond to the disclosed replenishment structure 120 as shown in FIGS. 3-8, which diffuses the inert gas molecules through both the permeable wall 126 and through at least one stage of control material such as shown at 124, 130, 142, 154 and 156.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the replenishment structure without departing from the spirit and scope of the present invention.

In addition, although the embodiments described herein are directed to the replenishment of an inert gas atmosphere within a data storage device, it will be appreciated by those skilled in the art that the claimed subject matter is not so limited and various other housing applications can be utilized without departing from the spirit and scope of the claimed invention.

What is claimed is:

1. A replenishment structure comprising:
    a reservoir which encloses an internal inert gas atmosphere and which comprises a permeable wall through which inert gas molecules from said atmosphere diffuse substantially at a first rate; and
    a control material adjacent the reservoir through which the inert gas molecules further diffuse substantially at a second rate less than the first rate to replenish a surrounding inert gas atmosphere.

2. The replenishment structure of claim 1, wherein the second rate of diffusion is substantially selected to match a rate at which inert gas molecules from the surrounding inert gas atmosphere escape from a housing.

3. The replenishment structure of claim 1, wherein the permeable wall comprises glass.

4. The replenishment structure apparatus of claim 1, wherein the inert gas molecules comprise helium molecules.

5. The replenishment structure of claim 1, wherein the control material comprises an epoxy.

6. The replenishment structure of claim 1, wherein the control material comprises polyimide.

7. The replenishment structure of claim 1, wherein the control material comprises ethylene vinyl alcohol polymer (EVOH).

8. The replenishment structure of claim 1, wherein the control material comprises ultra high density polyethylene.

9. The replenishment structure of claim 1, wherein the reservoir is embedded within the control material.

10. The replenishment structure of claim 1, further comprising a second control material adjacent the control material and through which the inert gas molecules further diffuse at a third rate less than the first rate to replenish the surrounding inert gas atmosphere.

11. The replenishment structure of claim 1, further comprising a restriction layer of substantially impermeable material adjacent a portion of the control material, said layer substantially restricting passage of the inert gas molecules therethrough.

12. The replenishment structure of claim 1 in combination with a hermetically sealed housing which encloses the replenishment structure and the surrounding inert gas atmosphere.

13. The combination of claim 12, wherein the hermetically sealed housing is characterized as a housing of a data storage device and wherein a data recording medium is disposed within the housing.

14. A method comprising:
    enclosing an inert gas atmosphere and a replenishment structure within a housing, the replenishment structure comprising a reservoir adjacent a control material, the reservoir having a permeable wall; and
    using the replenishment structure to replenish the inert gas atmosphere by diffusing inert gas molecules through the permeable wall at a first rate and then through the control material at a second rate less than the first rate.

15. The method of claim 14, wherein the using step comprises establishing the second rate of diffusion of the inert gas molecules in relation to a rate at which inert gas molecules of the inert gas atmosphere escape from to housing.

16. The method of claim 14, wherein the reservoir is characterized as a hollow member and wherein the permeable wall comprises a wall of the reservoir.

17. The method of claim 14, wherein the replenishment structure of the enclosing step further comprises a second control material through which the inert gas molecules further diffuse to the surrounding atmosphere at a rate less than the first rate.

18. The method of claim 14, wherein the inert gas molecules of the using step comprise helium molecules.

\* \* \* \* \*